US011195035B2

(12) United States Patent
Nakamura et al.

(10) Patent No.: US 11,195,035 B2
(45) Date of Patent: Dec. 7, 2021

(54) OCCUPANT MONITORING DEVICE FOR VEHICLE AND OCCUPANT PROTECTION SYSTEM FOR VEHICLE

(71) Applicant: SUBARU CORPORATION, Tokyo (JP)

(72) Inventors: Ryota Nakamura, Tokyo (JP); Junpei Tokizaki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 249 days.

(21) Appl. No.: 16/439,952

(22) Filed: Jun. 13, 2019

(65) Prior Publication Data

US 2020/0097744 A1    Mar. 26, 2020

(30) Foreign Application Priority Data

Sep. 26, 2018    (JP) .............................. JP2018-180058

(51) Int. Cl.
| | | |
|---|---|---|
| *G06K 9/00* | (2006.01) | |
| *B60R 21/013* | (2006.01) | |
| *B60R 21/16* | (2006.01) | |
| *B60R 21/015* | (2006.01) | |

(52) U.S. Cl.
CPC ........ *G06K 9/00838* (2013.01); *B60R 21/013* (2013.01); *B60R 21/01538* (2014.10); *B60R 21/16* (2013.01)

(58) Field of Classification Search
CPC .......... G06K 9/00838; B60R 21/01538; B60R 21/013; B60R 21/16

USPC .......................................................... 701/36
See application file for complete search history.

(56) References Cited

U.S. PATENT DOCUMENTS

| | | | | |
|---|---|---|---|---|
| 2008/0234899 A1* | 9/2008 | Breed | ................. | B60N 2/0232 |
| | | | | 701/47 |
| 2009/0092284 A1* | 4/2009 | Breed | .................... | B60N 2/002 |
| | | | | 382/103 |
| 2014/0168441 A1* | 6/2014 | Koike | ............... | B60R 21/01552 |
| | | | | 348/148 |

FOREIGN PATENT DOCUMENTS

| | | |
|---|---|---|
| JP | H11043009 | 2/1999 |
| JP | 2015140146 | 8/2015 |

* cited by examiner

*Primary Examiner* — Gertrude Arthur Jeanglaude
(74) *Attorney, Agent, or Firm* — Chip Law Group

(57) ABSTRACT

An occupant monitoring device for a vehicle is configured to monitor an occupant sitting on a seat provided in a vehicle and includes a light projector, an imaging device, and a processor. The light projector is configured to project light toward the occupant sitting on the seat. The imaging device is configured to capture an image of the occupant sitting on the seat. The processor is configured to control the light projector and the imaging device to capture the image of the occupant sitting on the seat. In a case where a collision of the vehicle is predicted, the imaging device captures the image at a higher speed than in a normal case where a collision of the vehicle is not predicted.

20 Claims, 12 Drawing Sheets

OCCUPANT MONITORING DEVICE FOR VEHICLE AND OCCUPANT PROTECTION SYSTEM FOR VEHICLE

CROSS-REFERENCE TO RELATED APPLICATIONS

The present application claims priority from Japanese Patent Application No. 2018-180058 filed on Sep. 26, 2018, the entire contents of which are hereby incorporated by reference.

BACKGROUND

The disclosure relates to occupant monitoring devices for vehicles and to occupant protection systems for vehicles.

Japanese Unexamined Patent Application Publication Nos. 11-043009 and 2015-140146 each disclose an occupant monitoring device that monitors on-board occupants in vehicles.

SUMMARY

An aspect of the disclosure provides an occupant monitoring device for a vehicle. The device is configured to monitor an occupant sitting on a seat provided in a vehicle and including a light projector, an imaging device, and a processor. The light projector is configured to project light toward the occupant sitting on the seat. The imaging device is configured to capture an image of the occupant sitting on the seat. The processor is configured to control the light projector and the imaging device to capture the image of the occupant sitting on the seat. In a case where a collision of the vehicle is predicted, the imaging device captures the image at a higher speed than in a normal case where a collision of the vehicle is not predicted.

An aspect of the disclosure provides an occupant protection system vehicle. The system includes the above occupant monitoring device and an occupant protection device configured to execute occupant protection control based on the image of the occupant captured by the occupant monitoring device.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

Figure 1:
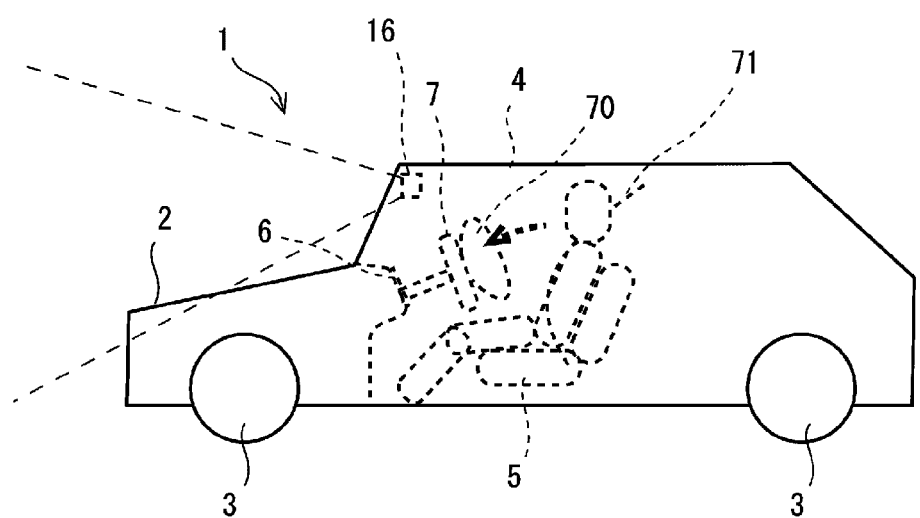
FIG. 1 illustrates occupant protection in an automobile according to a first example of the disclosure.

In the following, some embodiments of the disclosure are described in detail with reference to the accompanying drawings. Note that sizes, materials, specific values, and any other factors illustrated in respective embodiments are illustrative for easier understanding of the disclosure, and are not intended to limit the scope of the disclosure unless otherwise specifically stated. Further, elements in the following example embodiments which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale. It is conceivable that an image of an occupant is captured in the event of a collision and is utilized for occupant protection control.

However, a vehicle occupant monitoring device is normally provided for warning an occupant sitting on a seat by detecting the level of fatigue, dozing, and inattentive driving of the occupant.

Therefore, the vehicle occupant monitoring device captures an image of the entire upper body of the occupant sitting on the seat and determines the state of the occupant in accordance with, for example, movement of the upper body.

Furthermore, it is conceivable that the vehicle occupant monitoring device is sufficiently practical by simply capturing an image of the occupant about once every several tens of milliseconds to several hundreds of milliseconds.

However, if an image of the entire upper body of the occupant is captured about once every several tens of milliseconds to several hundreds of milliseconds, there is a possibility that the image cannot be sufficiently utilized in occupant protection control in the event of a collision. In occupant protection control in the event of a collision, immediacy is demanded such that the time from the detection of the collision to the control is short and the processing can be completed within the short period of time.

Accordingly, in the vehicle, it is desirable that the occupant protection control in the event of a collision be further improved based on the image captured by the occupant monitoring device.

First Embodiment

FIG. 1 illustrates occupant protection in an automobile 1 according to a first embodiment of the disclosure. In FIG. 1, an onboard imaging device 53 that captures a vehicle-exterior image is illustrated.

The automobile 1 is an example of a movable automobile 1 that accommodates one or more people. Other examples of the automobile 1 include a large-size vehicle, a two-wheeled vehicle, a personal mobility vehicle, a bicycle, a railway vehicle, an airplane, and a boat.

The automobile 1 in FIG. 1 includes a vehicle body 2, wheels 3 provided at the front and rear of the vehicle body 2, a seat 5 provided in an occupant compartment 4 of the vehicle body 2, a dashboard 6 provided in front of the seat 5, and a steering wheel 7 protruding rearward from the dashboard 6.

In such an automobile 1, an occupant boarding the occupant compartment 4 of the vehicle body 2 sits on the seat 5. Moreover, the occupant operates, for example, the steering wheel 7. The automobile 1 travels in accordance with the operation performed by the occupant by using a driving force of an engine and a motor (not illustrated).

Furthermore, for example, a destination is set in the automobile 1, so that the automobile 1 guides a route to the destination and travels automatically along the route to the destination.

Figure 2:
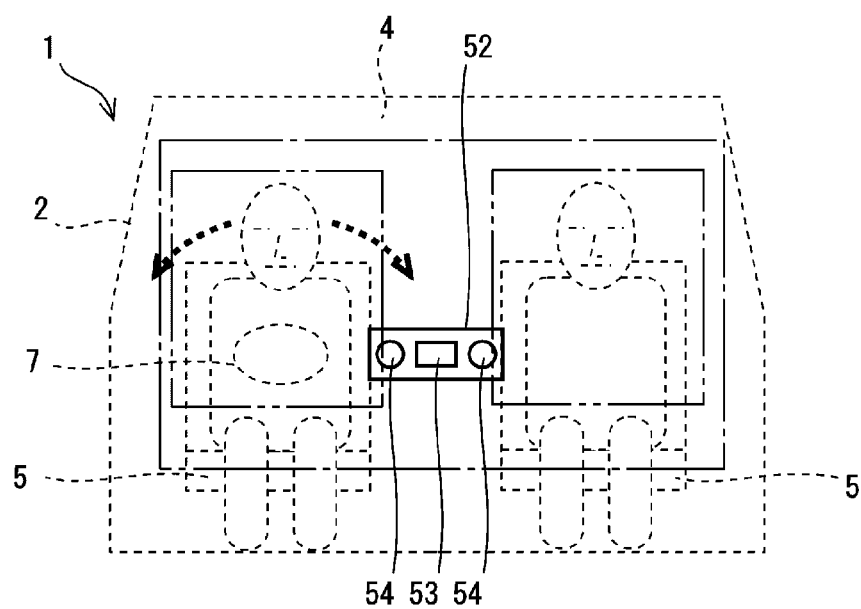
FIG. 2 illustrates the behavior of occupants, in the left-right direction, in the automobile in FIG. 1.

FIG. 2 illustrates the behavior of occupants, in the left-right direction, in the automobile 1 in FIG. 1.

FIG. 2 is a front view of the automobile 1 in FIG. 1 and illustrates two occupants sitting on a pair of left and right seats 5. The upper body of each occupant sitting on the corresponding seat 5 may tilt leftward or rightward on the seat 5 when the automobile 1 makes, for example, a right or left turn.

Figure 3:
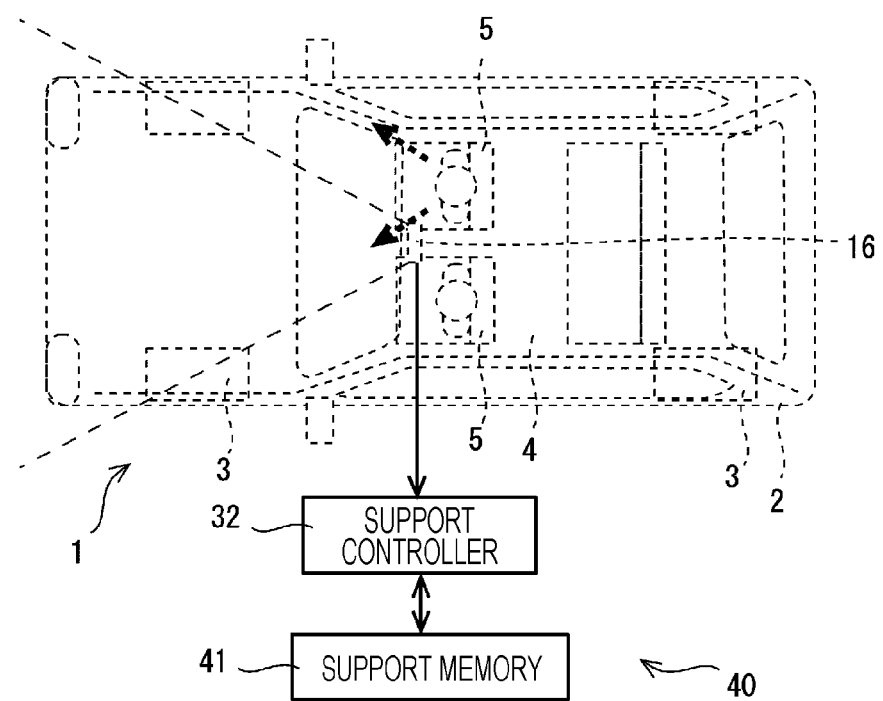
FIG. 3 illustrates the behavior of the occupants, in the diagonally forward direction, in the automobile in FIG. 1.

FIG. 3 illustrates the behavior of the occupants, in the diagonally forward direction, in the automobile 1 in FIG. 1.

FIG. 3 is a top view of the automobile 1 in FIG. 1 and illustrates two occupants sitting on the pair of left and right seats 5. The upper body of each occupant sitting on the corresponding seat 5 may tilt diagonally forward during, for example, braking of the automobile 1.

As illustrated in FIG. 1, the upper body of the occupant sitting on the seat 5 may tilt forward during, for example, braking of the automobile 1.

If excessive acceleration is not applied, the behavior of the upper body of the occupant is not significant.

However, for example, in the event of a collision, an excessive impact occurring during the collision may cause the upper body of the occupant to tilt greatly so as to protrude out from the seat 5.

Therefore, in order to support the upper body of each occupant sitting on the corresponding seat 5, an occupant protection device 60 including an airbag member 70 and a seatbelt member 71, as illustrated in FIG. 1, is used in the automobile 1.

The seatbelt member 71 has a belt extended across the front of the occupant sitting on the seat 5. The seatbelt member 71 actuates a belt actuator 63 in the event of a collision so as to apply tension to the belt. Consequently, in the event of a collision, the upper body of the occupant sitting on the seat 5 is supported by the belt, so that the upper body is less likely to protrude any further from the seat 5.

The airbag member 70 deploys an airbag 64 by using gas generated by an inflator in the event of a collision. In FIG. 1, the airbag 64 deploys at the rear side of the steering wheel 7, that is, in front of the upper body of the occupant sitting on the seat 5. Consequently, the upper body of the occupant tilting forward from the seat 5 abuts on the airbag 64. The airbag 64 deforms due to the load of the occupant, so as to absorb the kinetic energy acting on the upper body of the occupant.

With such an occupant protection device 60, the automobile 1 is capable of protecting the occupants even in the event of a collision.

When the automobile 1 is involved in a collision, it is conceivable that an image of each occupant is captured and is used for occupant protection control.

However, an occupant monitoring device 50 for the automobile 1 is normally provided for warning the occupant sitting on the seat 5 by detecting the level of fatigue, dozing, and inattentive driving of the occupant.

Therefore, the occupant monitoring device 50 for the automobile 1 captures an image of the entire upper body of the occupant sitting on the seat 5 and determines the state of the occupant in accordance with, for example, movement of the upper body.

Furthermore, it is conceivable that the occupant monitoring device 50 for the automobile 1 is sufficiently practical by simply capturing an image of the occupant about once every several tens of milliseconds to several hundreds of milliseconds, similar to a normal moving image.

However, if an image of the entire upper body of the occupant is captured about once every several tens of milliseconds to several hundreds of milliseconds, there is a possibility that the image cannot be sufficiently utilized in occupant protection control in the event of a collision. In occupant protection control in the event of a collision, immediacy is demanded such that the time from the detection of the collision to the control is short and the processing can be completed within the short period of time.

Accordingly, in the automobile 1, it is desirable that the occupant protection control in the event of a collision be further improved based on the image captured by the occupant monitoring device 50.

Figure 4:
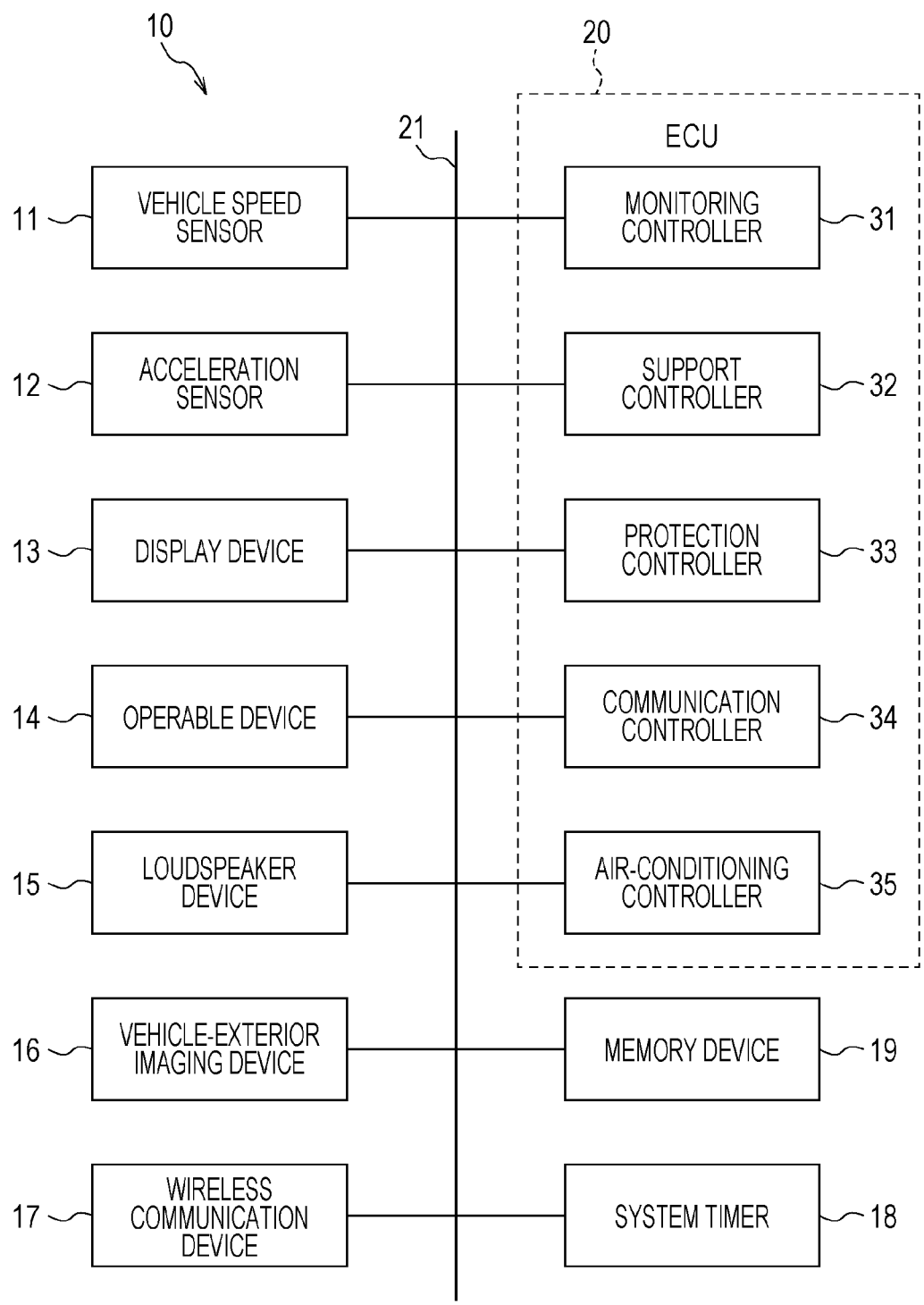
FIG. 4 illustrates a vehicle control system as an occupant protection system provided in the automobile in FIG. 1.

FIG. 4 illustrates a vehicle control system 10 as an occupant protection system provided in the automobile 1 in FIG. 1.

The vehicle control system 10 in FIG. 4 includes a vehicle speed sensor 11, an acceleration sensor 12, a display device 13, an operable device 14, a loudspeaker device 15, a vehicle-exterior imaging device 16, a wireless communication device 17, a system timer 18, a memory device 19, an electronic control unit (ECU) 20, and a vehicle-interior network 21 to which these devices are coupled.

The vehicle-interior network 21 includes, for example, a wired communication network compliant with a controller area network (CAN), a local interconnect network (LIN), and so on. The devices coupled to the vehicle-interior network 21 are distributively disposed at respective locations of the vehicle body 2 and exchange data with one another via the vehicle-interior network 21. The devices coupled to the vehicle-interior network 21 may individually be provided with central processing units (CPUs) for exchanging data via the vehicle-interior network 21, and may each serve as an individual device.

The vehicle speed sensor 11 detects a speed according to, for example, movement of the vehicle body 2 of the automobile 1 and outputs the speed to the vehicle-interior network 21.

The acceleration sensor 12 detects acceleration acting on the vehicle body 2 of the automobile 1 and outputs the acceleration to the vehicle-interior network 21. If impacts input to the vehicle body 2 from a plurality of directions are to be detected, a plurality of acceleration sensors 12 may be provided in the automobile 1 such that they are distributively provided near the outer peripheral surface of the vehicle body 2.

The display device 13 acquires display data from the vehicle-interior network 21 and displays an image based on the display data.

The operable device 14 is provided in, for example, the occupant compartment 4 and is to be operated by the occupant. The operable device 14 includes, for example, the steering wheel 7, a select lever, and a brake pedal.

The loudspeaker device 15 acquires sound data from the vehicle-interior network 21 and outputs sound based on the sound data.

The vehicle-exterior imaging device 16 is provided in, for example, the occupant compartment 4 of the automobile 1, captures an image of the surroundings of the automobile 1, and outputs the image data to the vehicle-interior network 21. For example, the vehicle-exterior imaging device 16 is provided facing forward near the ceiling of the occupant compartment 4, as illustrated in FIG. 1. In this case, the vehicle-exterior imaging device 16 captures an image of the front of the automobile 1.

The wireless communication device 17 communicates wirelessly with, for example, another device not coupled to the vehicle-interior network 21, such as another vehicle located outside the automobile 1, a base station, and a beacon device, and exchanges data therewith.

The system timer 18 measures a time period or a time point. The system timer 18 outputs the measured time period or time point to the devices coupled to the vehicle-interior network 21 via the vehicle-interior network 21. Thus, the plurality of devices coupled to the vehicle-interior network 21 can operate synchronously in accordance with, for example, the time point measured by the system timer 18.

The memory device 19 stores programs and data to be used for vehicle control by the ECU 20. The memory device 19 may be, for example, either one of a semiconductor memory device and a hard disk device.

The ECU 20 is a computer equipped with a CPU, such as a one-chip microcomputer. The one-chip microcomputer may contain the system timer 18 and the memory device 19 in addition to the CPU. The ECU 20 reads and executes a program stored in the memory device 19. Accordingly, a controller that controls the overall operation of the automobile 1 is realized in the ECU 20. The automobile 1 may be provided with a plurality of ECUs 20. In this case, the plurality of ECUs 20 operate in cooperation with each other to function as a controller.

In FIG. 4, an occupant monitoring controller 31, a driving support controller 32, a protection controller 33 for occupants, a communication controller 34, and an air-conditioning controller 35 are illustrated as the functions of the controller realized in the ECU 20.

The communication controller 34 manages data communication performed by the wireless communication device 17 and constitutes a wireless communication apparatus of the automobile 1, together with the wireless communication device 17. The communication controller 34 uses the wireless communication device 17 to exchange data, for controlling the driving of the automobile 1, with, for example, a server device of a traffic system (not illustrated), another vehicle corresponding to the traffic system, and so on.

The air-conditioning controller 35 controls air-conditioning operation in the occupant compartment 4 of the automobile 1.

The driving support controller 32 constitutes a driving support device 40 for the automobile 1, together with the vehicle-exterior imaging device 16 and a support memory 41 in FIG. 3. For example, the support memory 41 may be provided as a part of the memory device 19. Based on the settings of the support memory 41, the support controller 32 extracts structural objects surrounding the automobile 1, such as another vehicle, a pedestrian, a bicycle, a wall, and so on, from a vehicle-exterior image captured by the vehicle-exterior imaging device 16, and generates information about the distance and direction between the automobile 1 and each extracted object. The support controller 32 creates a path of the automobile 1 such that the automobile 1 does not intersect with or come close to the extracted objects and the paths of the objects, and controls the movement of the automobile 1 so that the automobile 1 travels along the created path. In that case, for example, if the occupant operates the operable device 14, such as the steering wheel 7, the support controller 32 assists with the movement of the automobile 1 such that the automobile 1 travels along a complemented path of the path according to the operation of the operable device 14.

Furthermore, the support controller 32 determines a possibility of an unavoidable collision with, for example, another vehicle by performing a process in FIG. 9, to be described later, and predicts a collision if the possibility is high.

Figure 5:
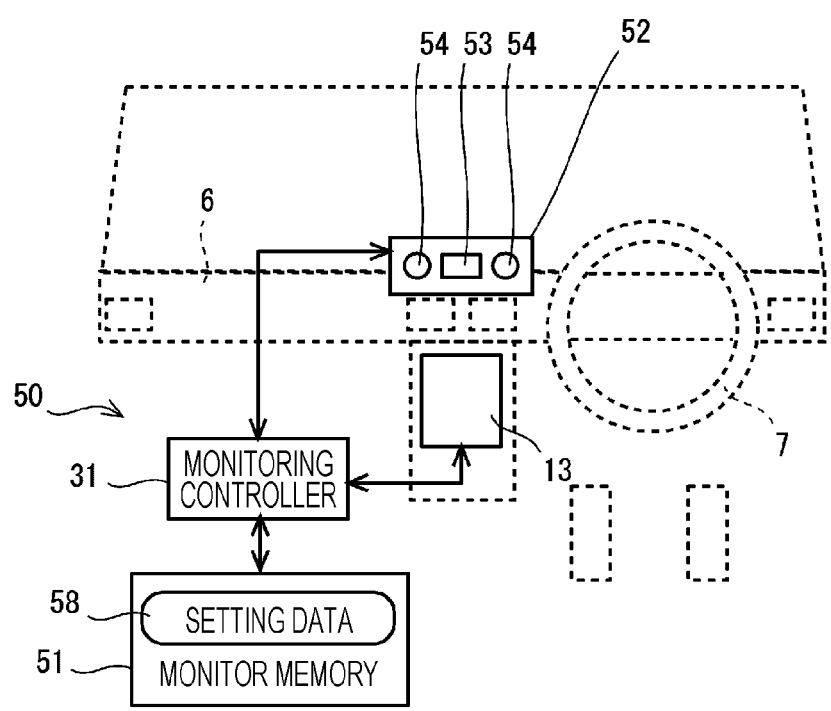
FIG. 5 illustrates an occupant monitoring device provided in the automobile in FIG. 1.

FIG. 5 illustrates the occupant monitoring device 50 provided in the automobile 1 in FIG. 1.

The occupant monitoring device 50 in FIG. 5 includes a monitor memory 51 and an optical unit 52, in addition to the occupant monitoring controller 31 in FIG. 4. The occupant monitoring device 50 monitors the occupants sitting on the seats 5 provided in the automobile 1.

As illustrated in FIGS. 5 and 2, the optical unit 52 is provided facing rearward in a central region of the dashboard 6 in the occupant compartment 4. The optical unit 52 includes the onboard imaging device 53 and a pair of light projectors 54.

The onboard imaging device 53 is provided facing rearward in the central region of the dashboard 6 in the occupant compartment 4. As indicated by a single-dot chain frame in FIG. 2, the onboard imaging device 53 captures an image of the entire upper bodies of the two occupants sitting on the pair of left and right seats 5 provided side-by-side in the vehicle-width direction for the respective occupants in the occupant compartment 4. Normally, the onboard imaging device 53 performs imaging at, for example, 30 frames per second, similar to a normal moving image. The onboard imaging device 53 normally captures an image of the occupants about once every several tens of milliseconds to several hundreds of milliseconds. Alternatively, the onboard imaging device 53 may perform imaging at, for example, a maximum of 120 frames per second that is higher than in the normal mode.

Each light projector 54 is provided facing rearward in the central region of the dashboard 6 in the occupant compartment 4. As indicated by a two-dot chain frame in FIG. 2, each light projector 54 projects nonvisible light, such as infrared light, onto the entire upper body of the occupant who is sitting on the corresponding seat 5 and whose image is to be captured by the onboard imaging device 53. For capturing the image of the faces of the occupants, the light projectors 54 are provided forward of the seated positions on the seats 5.

For example, the monitor memory 51 may be provided as a part of the memory device 19. The monitor memory 51 stores, for example, setting data 58 used for monitoring the occupants.

Figure 7:
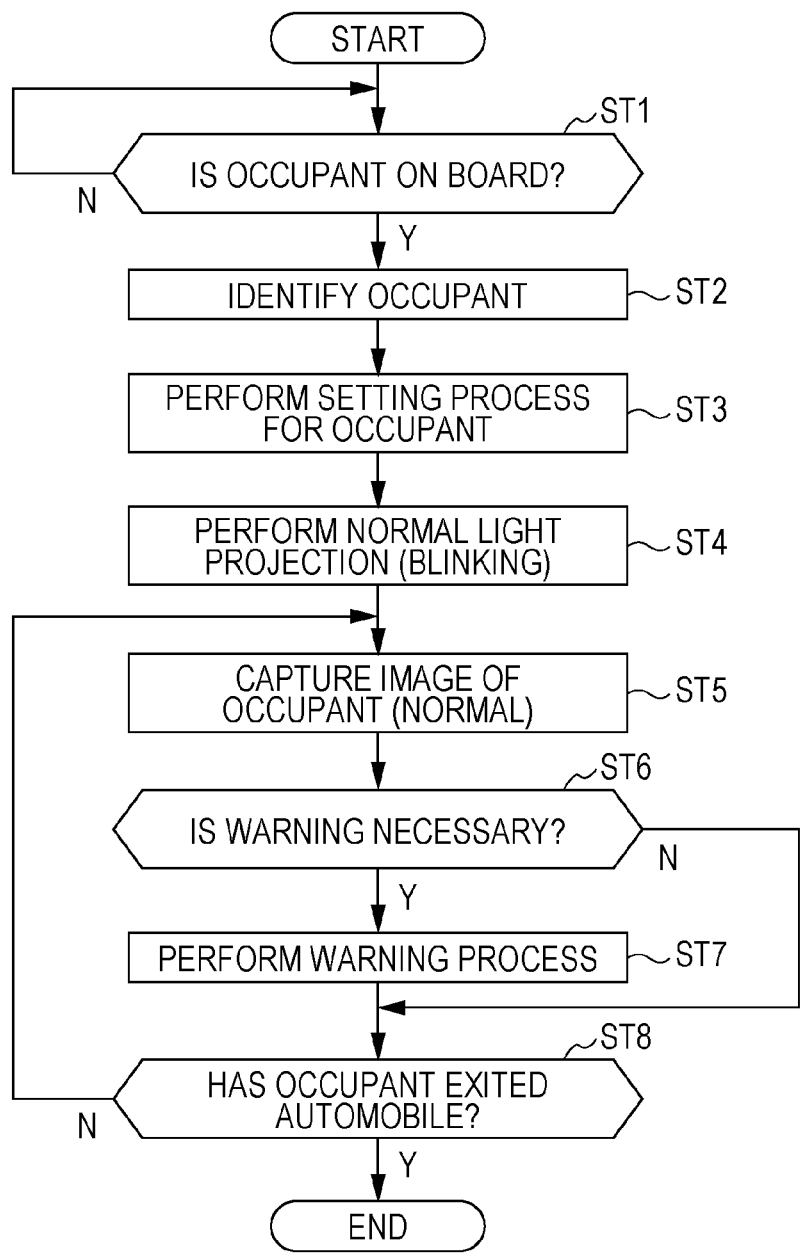
FIG. 7 is a flowchart illustrating a process performed in a normal mode by a monitoring controller in FIG. 5, in accordance with the first embodiment.

As illustrated in FIG. 7 to be described later, during normal driving, the monitoring controller 31 controls the light projectors 54 and the onboard imaging device 53 based on the setting data 58 in the monitor memory 51, determines the position and movement of the upper body of each occupant sitting on the corresponding seat 5 from a vehicle-interior image captured by the onboard imaging device 53, and determines whether the occupant is dozing or driving inattentively in accordance with the position and movement of the upper body. If the occupant is dozing or driving inattentively, the monitoring controller 31 uses the display device 13 and the loudspeaker device 15 to output a warning. Alternatively, the monitoring controller 31 may determine the orientation of the occupant's face and the movement of the occupant's eyes from the captured image and may output a warning about dozing or inattentive driving accordingly.

Furthermore, if a collision is predicted, the monitoring controller 31 executes occupant monitoring control for protecting the occupants when a collision is predicted in accordance the process in FIG. 9, to be described later.

Figure 6:
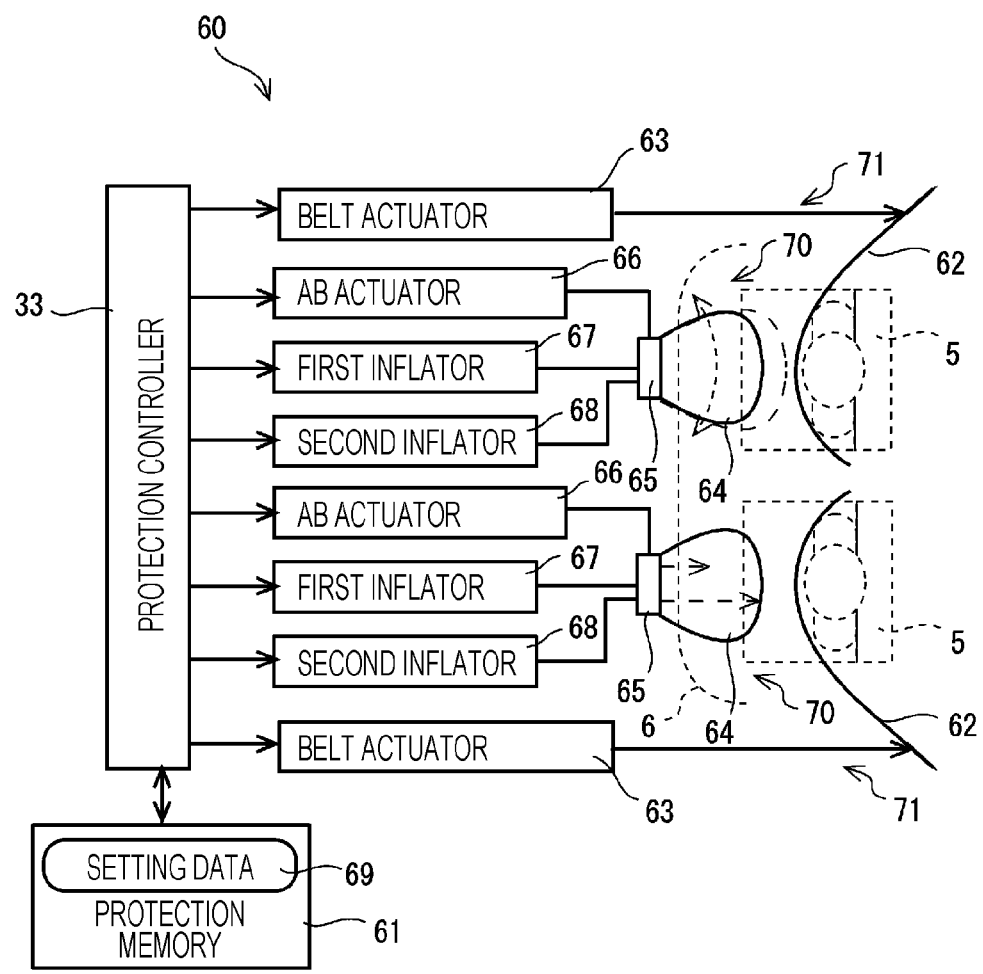
FIG. 6 illustrates an occupant protection device provided in the automobile in FIG. 1.

FIG. 6 illustrates the occupant protection device 60 provided in the automobile 1 in FIG. 1.

The occupant protection device 60 in FIG. 6 includes a protection memory 61, a plurality of seatbelts 62, a plurality of belt actuators 63, a plurality of airbags 64, a plurality of base members 65, a plurality of airbag actuators (AB actuators) 66, and a plurality of inflators 67 and 68, in addition to the protection controller 33 for the occupants in FIG. 4.

One set of a seatbelt 62 and a belt actuator 63 constitutes a single seatbelt member 71.

One set of an airbag 64, a base member 65, an airbag actuator 66, a first inflator 67, and a second inflator 68 constitutes a single airbag member 70.

In other words, in FIG. 6, two sets of seatbelt members 71 and two sets of airbag members 70 are illustrated in correspondence with the pair of left and right seats 5.

Each seatbelt 62 is a belt extended across the front of the waist and the upper body of the occupant sitting on the corresponding seat 5.

Each belt actuator 63 applies variable tension to the corresponding seatbelt 62. The seatbelt 62 receiving the tension may function to press the waist and the upper body of the occupant against the seat 5.

The airbags 64 are bags that are deployed instantaneously by high-pressure gas.

The first inflators 67 and the second inflators 68 generate high-pressure gas to be injected into the airbags 64. In a case where the first inflators 67 and the second inflators 68 are both actuated, the airbags 64 can be deployed with high pressure. In a case where the first inflators 67 or the second inflators 68 are actuated, the airbags 64 can be deployed with low pressure. By starting the operation of the first inflators 67 and the operation of the second inflators 68 at different timings, the airbags 64 can be deployed with a pressure change different from that when the inflators are actuated at the same timing.

Each base member 65 has the corresponding airbag 64 attached thereto and accommodates the airbag 64 in a folded state. The first inflators 67 and the second inflators 68 may also be provided in the base members 65.

Each airbag actuator 66 drives the corresponding base member 65 and adjusts either one of the position and the orientation of the base member 65. If the base member 65 is attached to the vehicle body 2 in a movable manner in, for example, the vehicle-width direction, the front-rear direction, and the up-down direction, the airbag actuator 66 slidably drives the base member 65 to adjust the position thereof.

If the base member 65 is provided in a rotatable manner at the attached position, the airbag actuator 66 rotatably drives the base member 65 to adjust the orientation thereof.

For example, the protection memory 61 may be provided as a part of the memory device 19. The protection memory 61 stores, for example, setting data 69 used for protecting the occupants.

The protection controller 33 for the occupants constitutes the occupant protection device 60 of the automobile 1, together with the acceleration sensor 12, and the airbag member 70 and the seatbelt member 71 illustrated in FIG. 1. When the protection controller 33 determines that the acceleration sensor 12 has detected acceleration exceeding a threshold value corresponding to an impact of a collision based on the settings in the memory device 19, the protection controller 33 executes protection control for the occupants. In order to protect each occupant, the protection controller 33 deploys the airbag 64 of each airbag member 70 and applies tension to the seatbelt 62 of each seatbelt member 71.

If a collision of the automobile 1 is predicted, the protection controller 33 executes occupant protection control based on an occupant image captured by the occupant monitoring device 50.

FIG. 7 is a flowchart illustrating a process performed in a normal mode by the monitoring controller 31 in FIG. 5, in accordance with the first embodiment.

When the power of the vehicle control system 10 in FIG. 4 is turned on as a result of an occupant boarding the automobile 1, the monitoring controller 31 repeatedly executes the process in FIG. 7.

In step ST1 of the normal monitoring control in FIG. 7, the monitoring controller 31 determines whether an occupant has boarded the automobile 1. The monitoring controller 31 repeats step ST1 until the monitoring controller 31 determines that an occupant has boarded the automobile 1.

When an occupant boards the automobile 1 and sits on the corresponding seat 5, the onboard imaging device 53 periodically repeats imaging, thereby capturing an image of the occupant sitting on the seat 5.

In step ST2, the monitoring controller 31 uses, for example, the setting data 58 for the occupant stored in the monitor memory 51 so as to identify the face of the occupant appearing in the image captured by the onboard imaging device 53.

In step ST3, the monitoring controller 31 uses, for example, the setting data 58 for the occupant stored in the monitor memory 51 so as to execute a setting process corresponding to the identified occupant. The monitoring controller 31 outputs either one of an identification number of the recognized occupant and the setting data 58 to the vehicle-interior network 21. Accordingly, for example, the operable device 14 adjusts the steering wheel 7 to a previously set position for the recognized occupant, the support controller 32 performs a driving-support setting process corresponding to the past driving history of the recognized occupant, the protection controller 33 performs a protection-control setting process corresponding to the recognized occupant, the air conditioner starts air-conditioning operation in accordance with past settings designated by the recognized occupant, and so on.

After the above-described setting process performed at the time of boarding, the support controller 32 starts to monitor the occupant.

In step ST4, the monitoring controller 31 causes each light projector 54 to emit light in accordance with normal light projection control. In normal light projection, the monitoring controller 31 causes the light projector 54 to intermittently emit light such that the light is output steadily in a continuously lit manner over a long period of time. By emitting light intermittently, the light projector 54 starts to project infrared light at a wide angle to the entire upper body of the occupant.

In step ST5, the monitoring controller 31 causes the onboard imaging device 53 to capture an image of the occupant sitting on the seat 5. The onboard imaging device 53 captures the image of the occupant sitting on the seat 5 at a normal imaging rate.

In step ST6, the monitoring controller 31 determines whether a warning is necessary based on the state of the occupant appearing in the captured image. The monitoring controller 31 identifies the position and movement of the upper body of the occupant in the captured image, and determines whether the occupant is dozing or driving inattentively in accordance with the identified position and movement of the upper body. If the occupant is neither dozing nor driving inattentively, the monitoring controller 31 determines that a warning is not necessary and causes the process to proceed to step ST8. If the occupant is dozing and driving inattentively, the monitoring controller 31 determines that a warning is necessary and causes the process to proceed to step ST7.

In step ST7, the monitoring controller 31 executes a warning process for drawing the attention of the occupant. For example, the monitoring controller 31 displays a warning on the display device 13 and outputs a warning sound from the loudspeaker device 15.

In step ST8, the monitoring controller 31 determines whether the occupant has exited the automobile 1. When the occupant no longer appears in the image captured by the onboard imaging device 53, the monitoring controller 31 determines that the occupant has exited the automobile 1. If the occupant has not exited the automobile 1, the monitoring controller 31 causes the process to return to step ST5. The monitoring controller 31 repeats the above-described monitoring process for the occupant who has not exited the automobile 1 based on a subsequent image captured by the onboard imaging device 53. When the occupant has exited the automobile 1, the monitoring controller 31 ends the process in FIG. 7.

Figure 8:
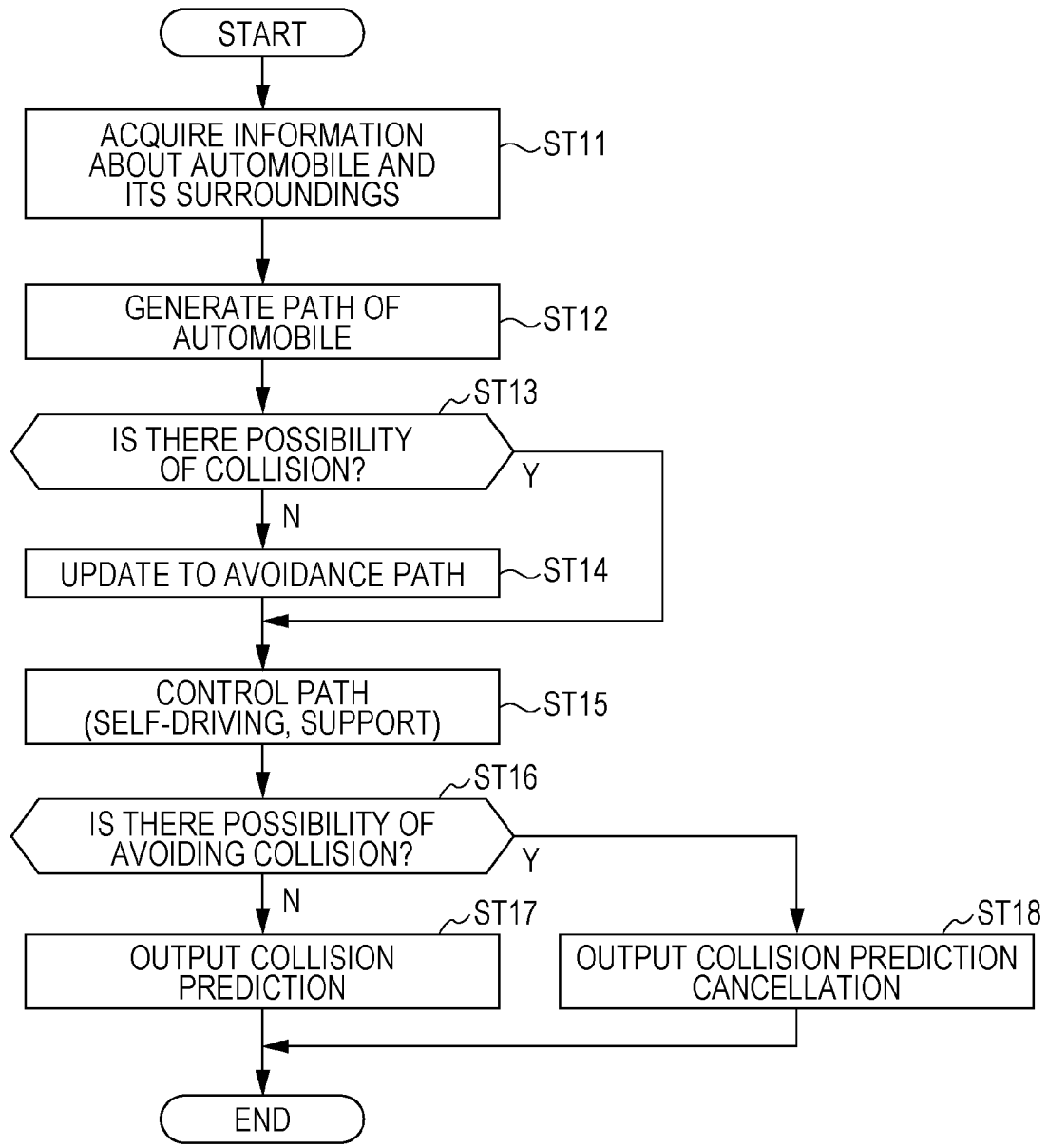
FIG. 8 is a flowchart illustrating a process performed by a support controller of a driving support device in FIG. 3.

FIG. 8 is a flowchart illustrating a process performed by the support controller 32 of the driving support device 40 in FIG. 3.

The support controller 32 repeats the process in FIG. 8 in a period in which the automobile 1 is running or has stopped.

In step ST11 of the driving support control in FIG. 8, the support controller 32 acquires information about the automobile 1 and its surroundings. For example, the support controller 32 acquires an image captured by the vehicle-exterior imaging device 16, movement data of another vehicle acquired by the communication controller 34 from the traffic system, a speed from the vehicle speed sensor 11, acceleration from the acceleration sensor 12, and path and route information from the support controller 32.

In step ST12, the support controller 32 generates a path of the automobile 1 based on the acquired information about the driving of the automobile 1. For example, the support controller 32 generates a most recent path based on the route information of the automobile 1.

In step ST13, the support controller 32 determines whether there is a possibility of a collision between another moving object, such as another vehicle, and the automobile 1. For example, the support controller 32 generates a path of the moving object from either one of the captured image and the movement data and determines whether the path of the moving object intersects with or comes close to the most recent path of the automobile 1. Then, if the most recent path of the automobile 1 and the path of the moving object intersect with or come close to each other, the support controller 32 determines that there is a possibility of a collision, and causes the process to proceed to step ST14. If the most recent path of the automobile 1 and the path of the moving object do not intersect with or come close to each other, the support controller 32 determines that there is no possibility of a collision, and causes the process to proceed to step ST15.

In step ST14, the support controller 32 updates the path generated in step ST12 such that the path is less likely to intersect with or come close to the path of the moving object. The support controller 32 updates the generated path such that, for example, the automobile 1 accelerates, decelerates, and stops along the path.

In step ST15, the support controller 32 controls the driving of the automobile 1 in accordance with the generated or updated path. The support controller 32 prioritizes the updated path over the generated path. If the automobile 1 is traveling in a self-driving mode, the support controller 32 causes the automobile 1 to travel along the generated or updated path. If the occupant operates the operable device 14, such as the steering wheel 7, the support controller 32 adjusts the operational amount in accordance with the generated or updated path, and causes the automobile 1 to travel accordingly.

In step ST16, the support controller 32 determines whether there is a possibility of avoiding a collision in a controlled driving mode. The support controller 32 acquires information from a sensor of the automobile 1, such as a most recent image captured by the vehicle-exterior imaging device 16, and determines whether there is a possibility of avoiding a collision with another moving object. Since the automobile 1 normally moves in accordance with the path updated in step ST14 to avoid a collision, the automobile 1 is capable of avoiding a collision with the moving object. However, for example, if the moving object moves unexpectedly, there is a possibility of a collision even if the automobile 1 moves in accordance with the updated path. The support controller 32 determines whether there is a possibility of avoiding a collision in accordance with, for example, relative movement of the moving object appearing in the captured image. The process of determining whether there is a possibility of avoiding a collision in step ST16 is stricter than the process of predicting a possibility of a collision in step ST14 and is for determining a possibility of whether a collision may actually occur. If there is no possibility of avoiding a collision, the support controller 32 causes the process to proceed to step ST17. If there is a possibility of avoiding a collision, the support controller 32 causes the process to proceed to step ST18.

In step ST17, the support controller 32 outputs a collision prediction to the vehicle-interior network 21. Subsequently, the support controller 32 ends the driving support control in FIG. 8.

In step ST18, the support controller 32 outputs a collision prediction cancellation to the vehicle-interior network 21. Subsequently, the support controller 32 ends the driving support control in FIG. 8.

According to the above-described process, the support controller 32 outputs a collision prediction in step ST17 if the support controller 32 determines that a collision may actually occur. If the support controller 32 determines that a collision may not actually occur, the support controller 32 outputs a collision prediction cancellation in step ST18.

Figure 9:
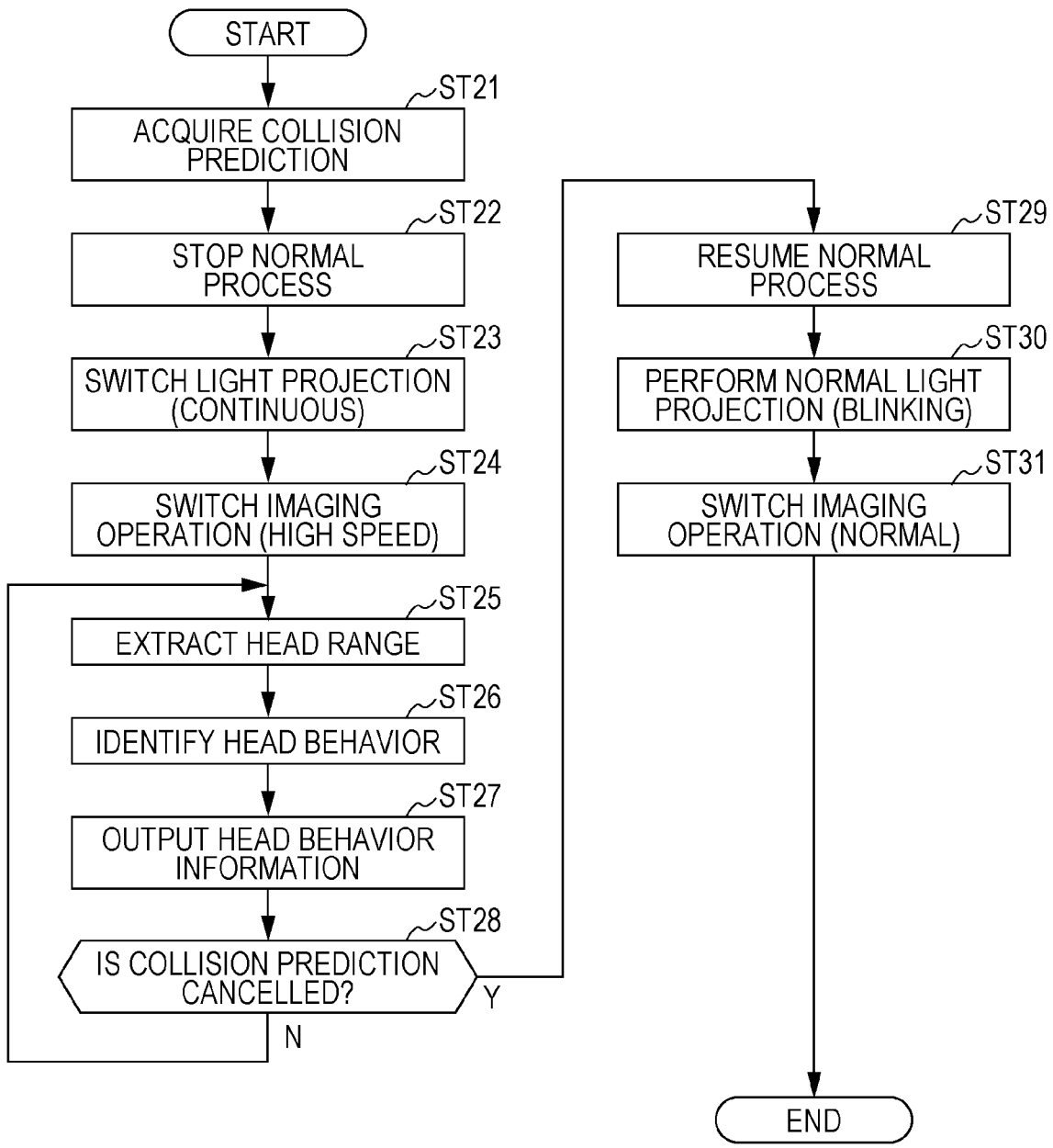
FIG. 9 is a flowchart illustrating a process performed by the monitoring controller in FIG. 5 when a collision is predicted.

FIG. 9 is a flowchart illustrating a process performed by the monitoring controller 31 in FIG. 5 when a collision is predicted.

If the monitoring controller 31 receives the collision prediction output in step ST17, the monitoring controller 31 executes the process in FIG. 9. The monitoring controller 31 repeats the process in FIG. 9 every time the monitoring controller 31 newly receives the collision prediction output in step ST17.

The monitoring controller 31 performs the process in FIG. 9 to extract an imaged region of the head of the occupant sitting on the seat 5 from the image captured by the onboard imaging device 53 and to execute image processing on the extracted regional image.

In step ST21 in the process in FIG. 9 corresponding to when a collision is predicted, the monitoring controller 31 acquires the collision prediction output in step ST17.

When the collision prediction is acquired, the monitoring controller 31 starts occupant monitoring control for protecting the occupant during a collision.

In step ST22, the monitoring controller 31 stops other normal processes executed in a normal state when a collision of the automobile 1 is not predicted. For example, the monitoring controller 31 stops the process in FIG. 7. Accordingly, the monitoring controller 31 operates in a single mode of executing only the process in FIG. 9 corresponding to when a collision is predicted.

In step ST23, the monitoring controller 31 changes the light projection mode of each light projector 54.

In detail, the monitoring controller 31 switches from the intermittent lighting mode in which the light projector 54 intermittently emits light with normal output to the continuous lighting mode in which the light projector 54 continuously emits light with maximum output. The maximum-output lighting mode involves causing the light projector 54 to emit light with maximum capacity. Although it is not possible to cause the light projector 54 to emit light continuously over a long period of time due to the effect of heat generation, the light projector 54 may be caused to continuously emit light with high output over a short period of time of, for example, about several minutes. The light projector 54 continuously emits light with a luminance higher the maximum luminance in a normal blinking mode.

Furthermore, in order to increase the amount of light to be radiated onto the head of the occupant, the monitoring controller 31 may further execute light-projection switching control.

For example, in order to reduce the light projection area, the monitoring controller 31 may switch the light projector 54 from a mode in which light is projected at a wide angle onto the entire upper body of the occupant sitting on the seat 5 to a mode in which light is projected at a narrow angle onto the head of the occupant and its periphery.

By performing such switching control for increasing the amount of light to be radiated onto the head of the occupant, if a collision of the automobile 1 is predicted, the light projector 54 can radiate intense light with a reduced light projection area than in the normal mode toward the head of the occupant whose image is to be captured by the onboard imaging device 53.

Moreover, because the light projector 54 continuously emits light, the amount of light from the light projector 54 is not limited for synchronizing with the imaging operation by the onboard imaging device 53.

In step ST24, the monitoring controller 31 switches the imaging operation of the onboard imaging device 53 so as to cause the onboard imaging device 53 to operate with, for example, a maximum frame rate that is higher than the normal frame rate. If a collision of the automobile 1 is predicted, the onboard imaging device 53 performs the imaging operation at a higher speed than in the normal case where a collision of the automobile 1 is not predicted.

In step ST25, the monitoring controller 31 clips out and extracts the regional image corresponding to the imaging range of the head of the occupant irradiated with the continuous intense light from the image captured by the onboard imaging device 53. The imaging range of the head may be a predetermined range with reference to, for example, an upper region of the seat 5.

In step ST26, the monitoring controller 31 uses the clipped regional image to identify the position and movement of the head.

For example, the monitoring controller 31 identifies the position of the head in the occupant compartment 4 in accordance with the imaged position of the head in the clipped regional image. The monitoring controller 31 identifies the movement of the head in the occupant compartment 4 in accordance with changes in the imaged position of the head in a plurality of regional images. The monitoring controller 31 predicts the behavior of the head in the occupant compartment 4, assuming that the head moves linearly at a speed according to the amount of identified movement of the head in the direction of movement of the head identified from the identified position of the head.

In step ST27, the monitoring controller 31 outputs head behavior information based on the identified head behavior to the vehicle-interior network 21. The monitoring controller 31 outputs predicted head behavior data in the occupant compartment 4 as the behavior information to the vehicle-interior network 21.

In step ST28, the monitoring controller 31 determines whether the collision prediction is cancelled.

If the monitoring controller 31 has not acquired the collision prediction cancellation output in step ST18, the monitoring controller 31 determines that the collision prediction is not cancelled and causes the process to return to step ST25. The monitoring controller 31 repeats the process from step ST25 to step ST28 until the collision prediction is cancelled, and repeatedly outputs the behavior information based on the most-recent regional image of the head.

When the monitoring controller 31 acquires the collision prediction cancellation output in step ST18, the monitoring controller 31 causes the process to proceed to step ST29.

In step ST29, the monitoring controller 31 resumes the normal process stopped in step ST22.

In step ST30, the monitoring controller 31 switches the light projection mode of each light projector 54, switched in step ST23, back to the normal light projection mode. The light projector 54 starts emitting light intermittently with normal output.

In step ST31, the monitoring controller 31 switches the imaging operation of the onboard imaging device 53, switched in step ST24, back to the normal mode. The onboard imaging device 53 starts operating with the normal frame rate.

Subsequently, the monitoring controller 31 ends the process in FIG. 9 corresponding to when a collision is predicted.

Consequently, the monitoring controller 31 operates in the normal mode for executing the process in FIG. 7.

Figure 10A:
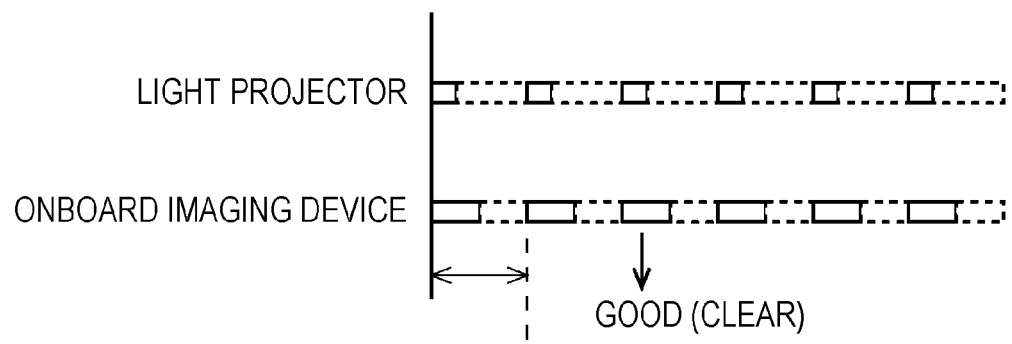
FIGS. 10A to 10C illustrate the relationship between lighting control of each light projector and imaging control of an onboard imaging device.
Figure 10B:
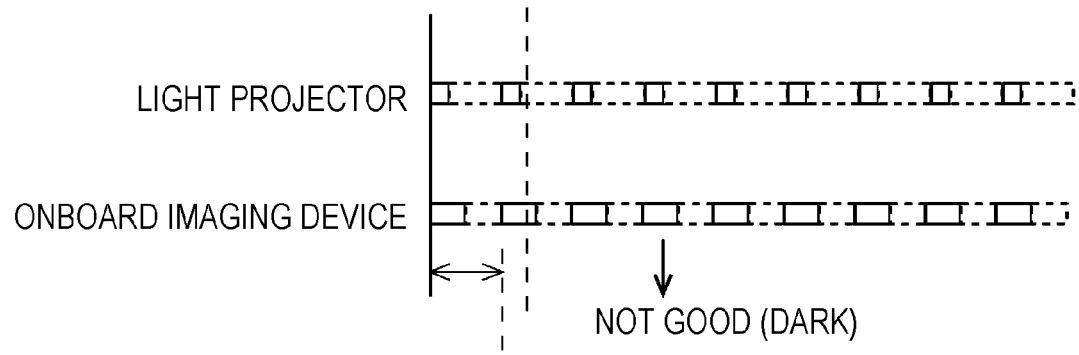
Figure 10C:
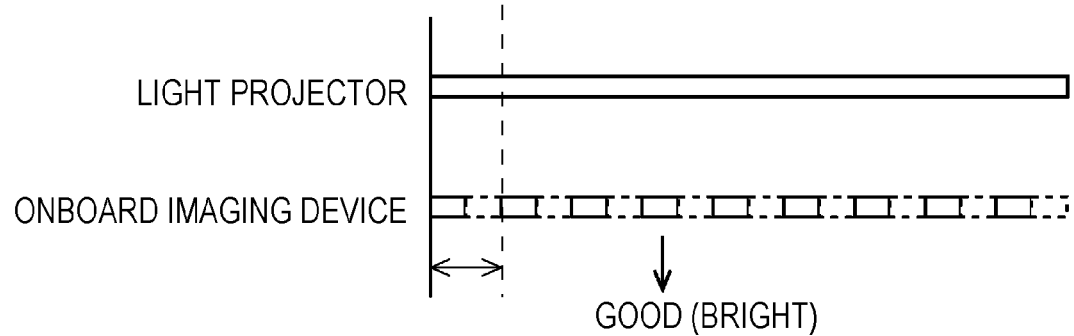

FIGS. 10A to 10C illustrate the relationship between lighting control of each light projector 54 and imaging control of the onboard imaging device 53.

FIG. 10A illustrates the correspondence relationship during the normal mode. In FIG. 10A, the onboard imaging device 53 captures an image in an imaging period for every normal imaging cycle. The light projector 54 emits light intermittently in a part of the imaging period during each imaging cycle. In this case, since the lighting period of the light projector 54 is included in the imaging period of the onboard imaging device 53, the light projector 54 is effectively utilized for capturing a clear image of the occupant.

FIG. 10B illustrates a comparative example where the imaging cycle is shortened for high-speed imaging by the onboard imaging device 53, and the intermittent lighting cycle of each light projector 54 is shortened accordingly. As compared with the imaging cycle and the imaging period of the onboard imaging device 53, when the lighting cycle and the lighting period of the light projector 54 are changed, the onboard imaging device 53 can perform imaging at high speed, but it is difficult to capture a clear image of the occupant due to the shorter lighting period during the imaging period. There is a high possibility that a darker image of the occupant may be obtained, as compared with the normal mode.

FIG. 10C illustrates an example where the imaging cycle is shortened for high-speed imaging by the onboard imaging device 53, and each light projector 54 is caused to emit light continuously, as in this embodiment. By causing the light projector 54 to emit light continuously in this manner, the light projector 54 can project light onto the occupant within the entire short imaging period of the onboard imaging device 53. Even in the shortened imaging period, the onboard imaging device 53 can still capture a clear image of the occupant.

Figure 11:
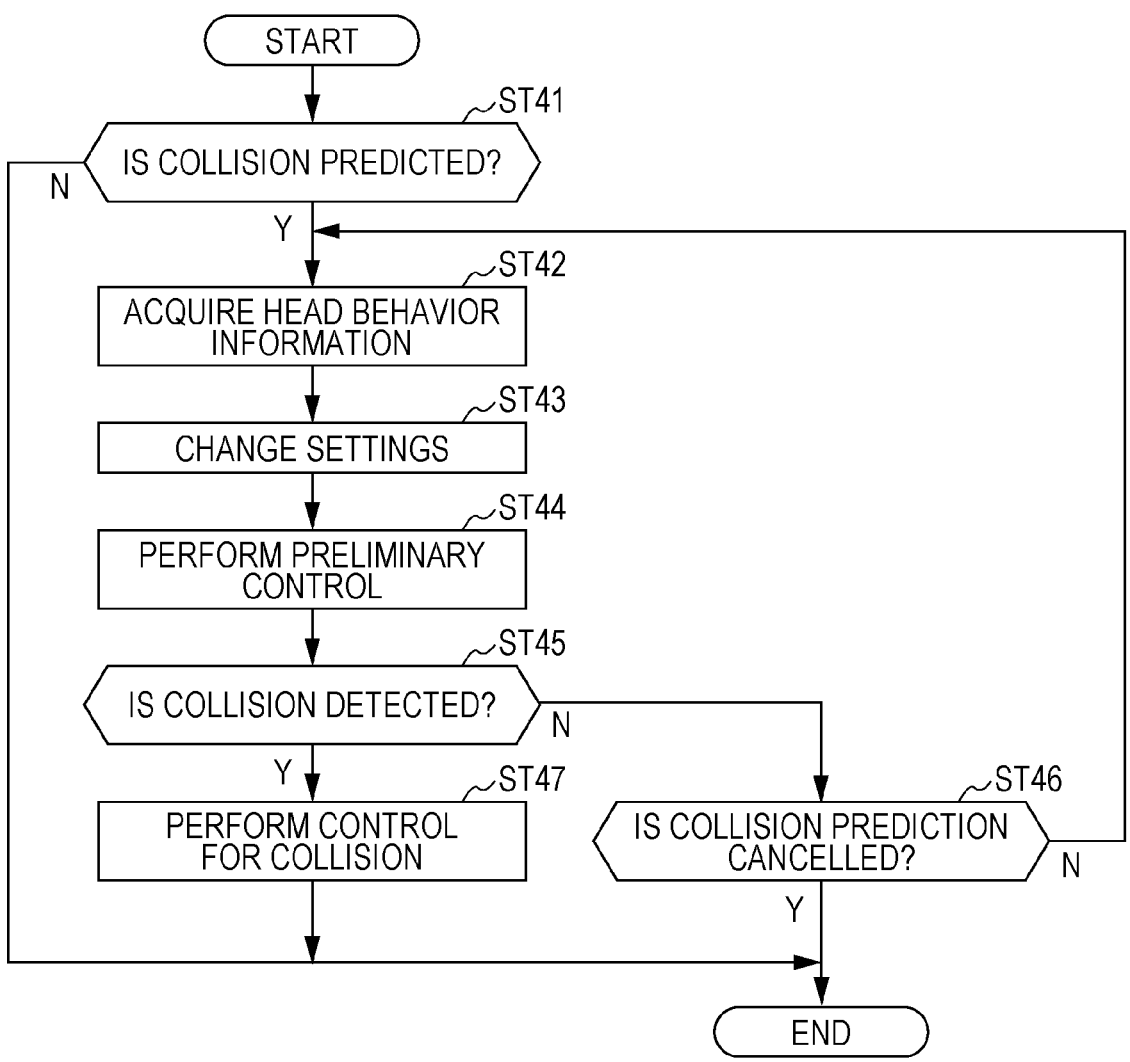
FIG. 11 is a flowchart illustrating a process performed by a protection controller in FIG. 6.

FIG. 11 is a flowchart illustrating a process performed by the protection controller 33 in FIG. 6.

The protection controller 33 for occupants executes the process in FIG. 11 when the protection controller 33 receives the collision prediction output in step ST17. The protection controller 33 repeats the process in FIG. 11 every time the protection controller 33 newly receives the collision prediction output in step ST17.

In step ST41 in the occupant protection process in FIG. 11, the protection controller 33 determines whether the collision prediction output in step ST17 is acquired.

If the collision prediction is not acquired, the protection controller 33 ends the occupant protection process in FIG. 11.

If the collision prediction is acquired, the protection controller 33 causes the process to proceed to step ST42.

In step ST42, the protection controller 33 acquires the most-recent behavior information output in step ST24.

In step ST43, the protection controller 33 changes the setting data 69 in the protection memory 61 based on the acquired most-recent behavior information.

For example, the protection controller 33 updates the setting data 69 with regard to the start timing for actuating the belt actuators 63, the setting for whether the first inflators 67 are to be actuated, the start timing for actuating the first inflators 67, the setting for whether the second inflators 68 are to be actuated, and the start timing for actuating the second inflators 68, based on a behavior prediction of the heads of the occupants included in the behavior information.

Furthermore, based on the behavior prediction and the head position of the occupants included in the behavior information, the protection controller 33 uses the airbag actuators 66 to drive the base members 65 such that the airbags deploy in the direction in which the occupants' heads tilt due to an impact of a collision.

Accordingly, the protection controller 33 can change the settings for the occupant protection control in accordance with either one of the head position and behavior based on the image of the occupants captured by the occupant monitoring device 50. In accordance with either one of the head position and behavior based on the image of the occupants captured by the occupant monitoring device 50, the protection controller 33 can change the settings with regard to the start timing for deploying the airbags 64, the position of deployment of the airbags 64, the direction of deployment of the airbags 64, the size of deployment of the airbags 64, the speed of deployment of the airbags 64, and the firmness of the airbags 64 when deployed.

In step ST44, the protection controller 33 executes preliminary control prior to collision detection based on the fact that a collision is predicted.

In preliminary control, for example, the protection controller 33 actuates the belt actuators 63 to pull in the seatbelts 62, thereby causing the seatbelts 62 to come into contact with the occupants.

In step ST45, the protection controller 33 determines whether a collision is detected. For example, the protection controller 33 determines whether a collision is detected based on whether excessive acceleration corresponding to an impact of a collision is detected by the acceleration sensor 12.

If a collision is not detected, the protection controller 33 determines in step ST46 whether the collision prediction is cancelled in step ST18. If the collision prediction is cancelled, the protection controller 33 ends the occupant protection process in FIG. 11. If the collision prediction is not cancelled, the protection controller 33 causes the process to return to step ST42. The protection controller 33 repeats the process from step ST42 to step ST46 until the protection controller 33 determines that a collision is detected or the collision prediction is cancelled. For example, the protection controller 33 changes the settings in accordance with the behavior of the heads of the occupants immediately before a collision and executes the preliminary control.

If a collision is detected, the protection controller 33 executes the occupant protection control based on the changed settings in step ST47.

In control performed during a collision, for example, the protection controller 33 causes the belt actuators 63 to apply tension to the seatbelts 62 in accordance with the settings. The protection controller 33 actuates the first inflators 67 and the second inflators 68 in accordance with the settings. This causes the airbags 64 to deploy. The kinetic energy of the occupants during the collision may be absorbed by the seatbelts 62 and the airbags 64.

Accordingly, in this embodiment, the occupant monitoring device 50 of the automobile 1 monitors the occupants sitting on the seats 5 provided in the automobile 1 during a normal driving mode. In a case where a collision of the automobile 1 is predicted, the onboard imaging device 53 that captures an image of the occupants sitting on the seats 5 performs the imaging operation at higher speed, for occupant protection control, than in the normal mode in which a collision of the automobile 1 is not predicted. Thus, in this embodiment, the position and behavior of the head of each occupant sitting on the corresponding seat 5 can be identified quickly in real time based on the image captured at a shorter time interval than in the normal mode.

As a result, in this embodiment, the position and behavior of the head of each occupant sitting on the corresponding seat 5 in the captured image can be identified at high speed and in real time, so that the position and behavior of the head of the occupant can be presumed immediately. If a collision of the automobile 1 is predicted, the occupant protection device 60 can favorably predict the position and movement of the head of each occupant during the collision based on an image captured in real time in accordance with temporal resolution at a high speed at which immediacy can be obtained such as to be usable in control during the collision, so that the occupant protection device 60 can execute occupant protection control in correspondence with the position and movement. Thus, proper occupant protection control that can be expected as a result of using the occupant monitoring device 50 can be executed.

Accordingly, in this embodiment, the occupant protection control performed in the event of a collision can be further improved based on the image captured by the occupant monitoring device 50.

In this embodiment, if a collision of the automobile 1 is predicted, the process executed in the normal mode in which a collision of the automobile 1 is not predicted is stopped, and a process is performed on an image captured by the onboard imaging device 53 such that only an imaged region of the head of each occupant sitting in the corresponding seat 5 is processed. Thus, in this embodiment, when a collision is predicted, the imaging operation is performed at a higher speed than in the normal mode and a larger number of captured images can thus be processed, without being inhibited by other processes. In this embodiment, when a collision of the automobile 1 is predicted, a larger number of captured images than in the normal mode can be appropriately processed without impairing the real-time properties.

In this embodiment, the light projectors 54 project non-visible infrared light toward the heads of the occupants sitting on the seats 5. Thus, even if the heads are irradiated with intense light, the visibility of the occupants is less likely to be obstructed.

In this embodiment, the occupant protection device 60 changes the settings for the occupant protection control in accordance with either one of the position and behavior of the head based on the image of each occupant captured by the occupant monitoring device 50. If a collision is detected, the occupant protection device 60 executes the occupant protection control based on the changed settings.

For example, the occupant protection device 60 changes the settings with regard to the start timing for deploying the airbags 64, the position of deployment of the airbags 64, the direction of deployment of the airbags 64, the size of deployment of the airbags 64, the speed of deployment of the airbags 64, and the firmness of the airbags 64 when deployed.

Accordingly, in this embodiment, the occupant protection control performed in the event of a collision can be further improved based on the image captured by the occupant monitoring device 50.

Second Embodiment

Next, an automobile 1 and a vehicle control system 10 according to a second embodiment of the disclosure will be described. The following description is mainly directed to differences from the above-described embodiment. Components identical to those in the above-described embodiment are given the same reference signs, and descriptions thereof are omitted.

Figure 12A:
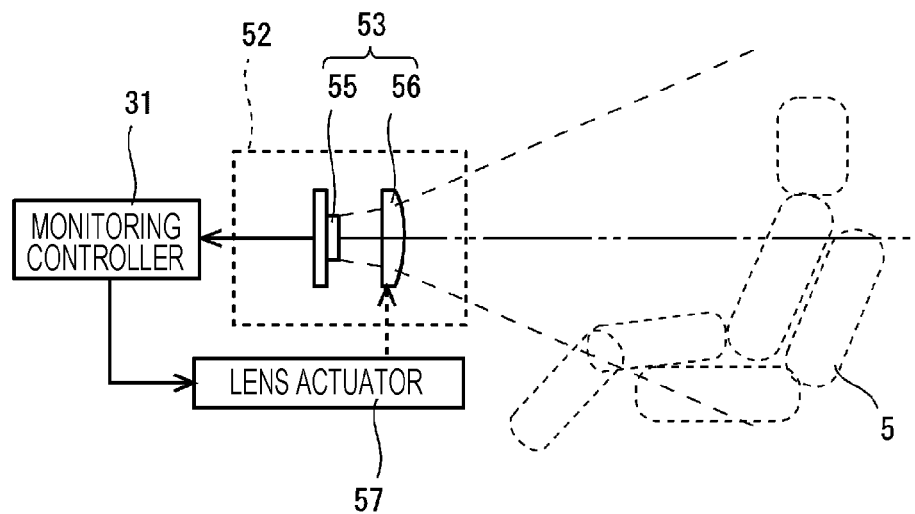
FIGS. 12A and 12B illustrate a state where an image of an occupant is being captured by an onboard imaging device according to a second embodiment of the disclosure.
Figure 12B:
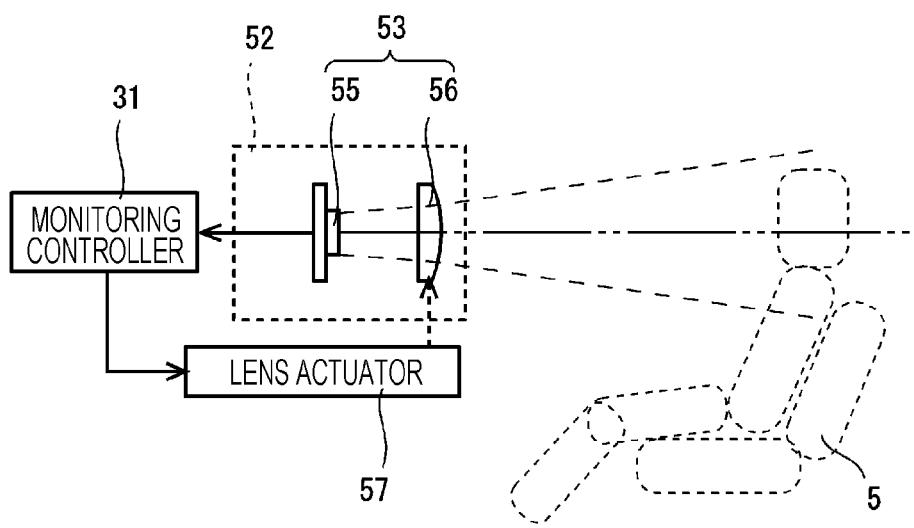

FIGS. 12A and 12B illustrate a state where an image of an occupant is being captured by an onboard imaging device 53 according to the second embodiment of the disclosure.

Specifically, FIGS. 12A and 12B illustrate a state where light is projected onto the occupant by the onboard imaging device 53 in FIG. 5.

As illustrated in FIGS. 12A and 12B, the onboard imaging device 53 includes a light receiver 55, a lens 56 as an optical member, and a lens actuator 57.

The light receiver 55 is, for example, either one of a charge-coupled device (CCD) sensor and a complementary metal oxide semiconductor (CMOS) sensor capable of receiving infrared light.

The lens 56 is movable along the optical axis of the light receiver 55. The lens 56 collects light from each occupant as a subject sitting on the corresponding seat 5 and focuses the light onto the light receiver 55.

The lens actuator 57 is controlled by the monitoring controller 31 so as to drive the lens 56 in the optical-axis direction of the light receiver 55.

As illustrated in FIG. 12A, in a case where the lens 56 is located within a normal control range near the light receiver 55, light from the entire upper body of the occupant sitting on the seat 5 is collected by the lens 56 and is focused onto the light receiver 55.

As illustrated in FIG. 12B, in a case where the lens 56 is located outside the normal control range distant from the light receiver 55, light from the head of the occupant sitting on the seat 5 is collected by the lens 56 and is focused onto the light receiver 55.

Accordingly, the onboard imaging device 53 has an adjustable focusing lens so as to be capable of switching between a wide-range imaging mode in FIG. 12A and a narrow-range imaging mode in FIG. 12B.

Figure 13:
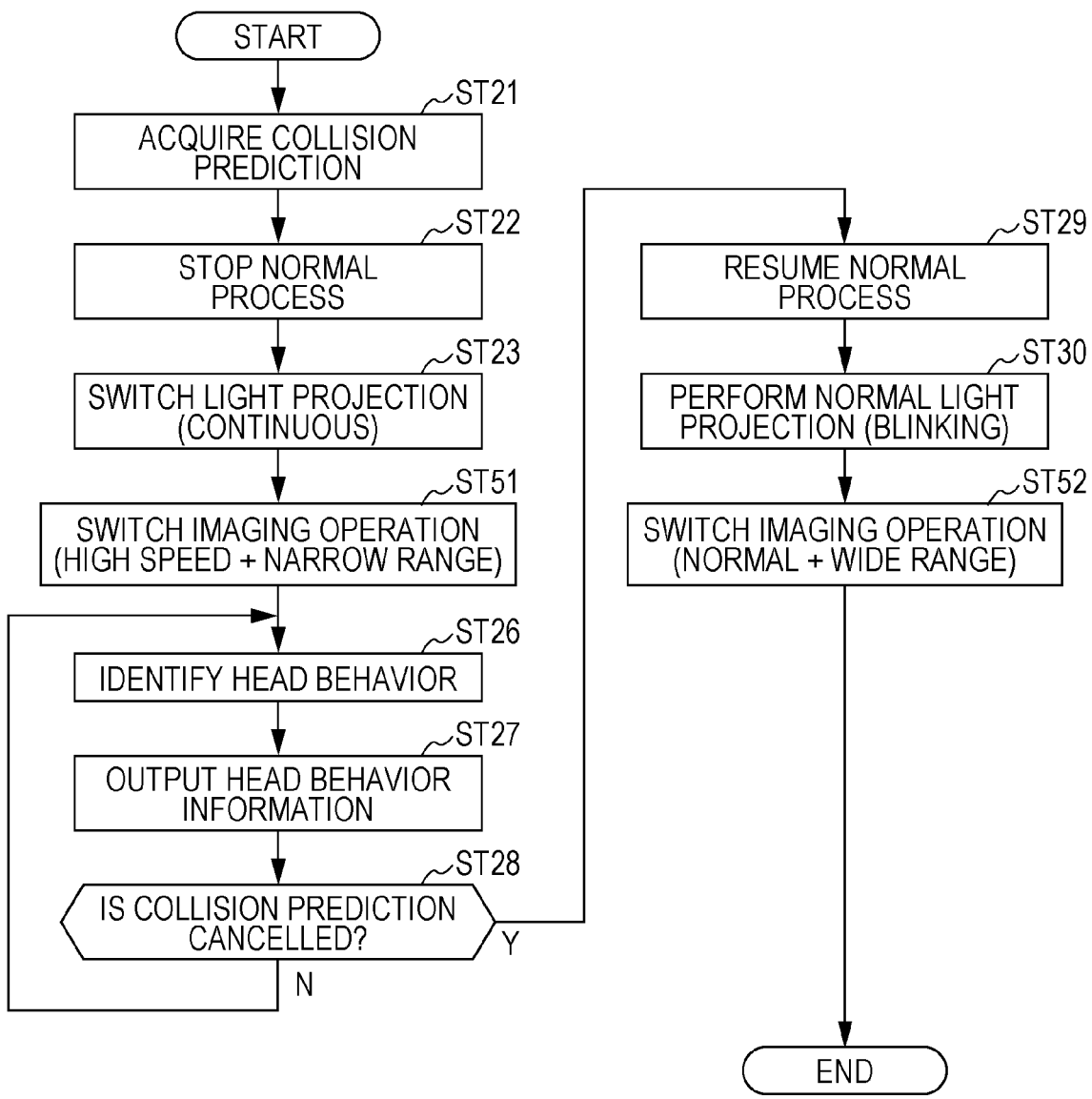
FIG. 13 is a flowchart illustrating a process performed in the normal mode by the monitoring controller in FIG. 5, in accordance with the second embodiment.

FIG. 13 is a flowchart illustrating a process performed in the normal mode by the monitoring controller 31 in FIG. 5, in accordance with the second embodiment.

In FIG. 13, steps similar to those in the process in FIG. 9 are given the same reference signs as in FIG. 9, and descriptions thereof are omitted.

In step ST51, the monitoring controller 31 switches the imaging operation of the onboard imaging device 53.

For example, the monitoring controller 31 switches the onboard imaging device 53 from the normal wide-range imaging mode in FIG. 12A to the narrow-range imaging mode in FIG. 12B.

Furthermore, the monitoring controller 31 causes the onboard imaging device 53 to operate with, for example, a maximum frame rate that is higher than the normal frame rate.

Accordingly, when a collision of the automobile 1 is predicted, the onboard imaging device 53 captures an image of the head of each occupant at a higher speed than in the normal case where a collision of the automobile 1 is not predicted.

Subsequently, in step ST26, the monitoring controller 31 uses a clipped regional image to identify the position and movement of the head.

Accordingly, when a collision of the automobile 1 is predicted, the imaging operation by the onboard imaging device 53 is switched to the narrow-range imaging mode. Because the head of the occupant in the captured image is expanded, the monitoring controller 31 can perform step ST26 after step ST51 without performing the regional-image clipping process in step ST25 in FIG. 9.

In step ST31 after a collision of the automobile 1 is no longer predicted, the monitoring controller 31 switches the imaging mode of the onboard imaging device 53 switched in step ST51 back to the normal mode. The onboard imaging device 53 starts the wide-range imaging operation with the normal frame rate.

Subsequently, the monitoring controller 31 ends the process in FIG. 13 corresponding to when a collision is predicted. Consequently, the monitoring controller 31 operates in the normal mode for executing the process in FIG. 7.

Accordingly, in this embodiment, when a collision of the automobile 1 is predicted, the imaging range of the onboard imaging device 53 is switched from the wide-range imaging mode in which an image of the upper body of each occupant sitting on the corresponding seat 5 is captured to the narrow-range imaging mode in which an image of the head of the occupant is captured. Accordingly, for example, the onboard imaging device 53 captures only an expanded image of the head of the occupant instead of capturing the entire upper body. Therefore, in this embodiment, the position and behavior of the head can be accurately identified from the head of the occupant appearing largely in the captured image.

The above-described embodiments are merely examples of the disclosure and are not limited thereto. Various modifications and alterations are possible within the scope of the disclosure.

For example, in each of the above-described embodiments, the occupant monitoring device 50 is coupled to the vehicle-interior network 21. Alternatively, for example, since the occupant monitoring device 50 is communicable with the wireless communication device 17, the occupant monitoring device 50 may exchange data with the occupant protection device 60. The occupant monitoring device 50 and the wireless communication device 17 may exchange data by a relatively-short-distance communication method compliant with, for example, the IEEE 802.1X standard. In this case, the occupant monitoring device 50 may be detachable from the automobile 1. The occupant monitoring device 50 detachable from the automobile 1 may be positioned and fixed to the occupant compartment 4 by using a mounter.

The invention claimed is:

1. An occupant monitoring device for a vehicle configured to monitor an occupant sitting on a seat provided in the vehicle, the occupant monitoring device comprising:
   a light projector configured to project light toward the occupant sitting on the seat;
   an imaging device configured to capture an image of the occupant sitting on the seat; and
   a processor configured to:
      control the light projector and the imaging device to capture the image of the occupant sitting on the seat;
      predict a collision of the vehicle; and
      control, based on the predicted collision of the vehicle, the imaging device to capture the image at a higher speed than a speed at which the image is captured in a normal case where the collision of the vehicle is not predicted.

2. The occupant monitoring device for the vehicle according to claim 1,
   wherein, the processor is further configured to:
      stop, based on the predicted collision of the vehicle, a first process executed in the normal case where the collision of the vehicle is not predicted; and
      execute, based on the predicted collision of the vehicle, a second process on the image captured by the imaging device, wherein the second process includes processing a head region of the occupant sitting on the seat in the image captured by the imaging device.

3. The occupant monitoring device for the vehicle according to claim 1,
   wherein the processor is further configured to:
      control imaging operation of the imaging device to switch between a wide-range imaging mode in which an image of an upper body of the occupant sitting on the seat is captured and a narrow-range imaging mode in which an image of a head of the occupant sitting on the seat is captured; and
      switch the imaging operation of the imaging device to the wide-range imaging mode in the normal case where the collision of the vehicle is not predicted; and
      switch the imaging operation of the imaging device to the narrow-range imaging mode based on the predicted collision of the vehicle.

4. The occupant monitoring device for the vehicle according to claim 1,
   wherein the light projector is further configured to project nonvisible light toward a head of the occupant sitting on the seat.

5. The occupant monitoring device for the vehicle according to claim 2,
   wherein the light projector is further configured to project nonvisible light toward a head of the occupant sitting on the seat.

6. The occupant monitoring device for the vehicle according to claim 3,
   wherein the light projector is further configured to project nonvisible light toward the head of the occupant sitting on the seat.

7. The occupant monitoring device for the vehicle according to claim 1, wherein
   the processor is further configured to switch, based on the predicted collision of the vehicle, a light projection mode of the light projector from an intermittent lighting mode to a continuous lighting mode, wherein
      in the intermittent lighting mode, the light projector is configured to project the light intermittently, and
      in the continuous lighting mode, the light projector is configured to project the light continuously.

8. An occupant protection system for a vehicle, the occupant protection system comprising:
   an occupant monitoring device for the vehicle configured to monitor an occupant sitting on a seat provided in the vehicle, wherein the occupant monitoring device comprises:
      a light projector configured to project light toward the occupant sitting on the seat:
      an imaging device configured to capture an image of the occupant sitting on the seat; and
      a processor configured to:
         control the light projector and the imaging device to capture the image of the occupant sitting on the seat;
         predict a collision of the vehicle; and
         control, based on the predicted collision of the vehicle, the imaging device to capture the image at a higher speed than a speed at which the image is captured in a normal case where the collision of the vehicle is not predicted; and an occupant protection device configured to execute occupant protection control based on the image of the occupant captured by the imaging device.

9. The occupant protection system for the vehicle according to claim 8,
wherein the occupant protection device is further configured to:
change the occupant protection control in accordance with one of a position or behavior of a head of the occupant sitting on the seat,
wherein one of the position or the behavior of the head is based on the image of the occupant captured by the occupant monitoring imaging device; and
execute the changed occupant protection control a based on a detection of the collision.

10. The occupant protection system for the vehicle according to claim 8,
wherein, the occupant protection device is further configured to change, in accordance with one of a position or behavior of a head of the occupant sitting on the seat, at least one of a start timing for deploying an airbag, a position of deployment of the airbag, a direction of deployment of the airbag, a size of deployment of the airbag, a speed of deployment of the airbag, or firmness of the airbag when deployed, and
wherein one of the position or the behavior of the head is based on the image of the occupant captured by the imaging device.

11. An occupant protection system for a vehicle, the occupant protection system comprising:
an occupant monitoring device for the vehicle configured to monitor an occupant sitting on a seat provided in the vehicle, the occupant monitoring device comprising:
a light projector configured to project light toward the occupant sitting on the seat:
an imaging device configured to capture an image of the occupant sitting on the seat; and
a processor configured to:
control the light projector and the imaging device to capture the image of the occupant sitting on the seat;
predict a collision of the vehicle;
control, based on the predicted collision of the vehicle, the imaging device to capture the image at a higher speed than a speed at which the image is captured in a normal case where the collision of the vehicle is not predicted;
stop, based on the predicted collision of the vehicle, a first process executed in the normal case where the collision of the vehicle is not predicted; and
execute, based on the predicted collision of the vehicle, a second process on the image captured by the imaging device, wherein the second process includes processing a head region of the occupant sitting on the seat in the image captured by the imaging device; and
an occupant protection device configured to execute occupant protection control based on the image of the occupant captured by the imaging device.

12. The occupant protection system for the vehicle according to claim 11,
wherein the occupant protection device is further configured to:
change the occupant protection control in accordance with one of a position or behavior of a head of the occupant sitting on the seat,
wherein one of the position or the behavior of the head is based on the image of the occupant captured by the imaging device; and
execute the changed occupant protection control based on a detection of the collision.

13. The occupant protection system for the vehicle according to claim 11,
wherein, the occupant protection device is further configured to change, in accordance with one of a position or behavior of a head of the occupant sitting on the seat, at least one of a start timing for deploying an airbag, a position of deployment of the airbag, a direction of deployment of the airbag, a size of deployment of the airbag, a speed of deployment of the airbag, or firmness of the airbag when deployed, and
wherein one of the position or the behavior of the head is based on the image of the occupant captured by the imaging device.

14. An occupant protection system for a vehicle, the occupant protection system comprising:
an occupant monitoring device for the vehicle configured to monitor an occupant sitting on a seat provided in the vehicle, the occupant monitoring device comprises:
a light projector configured to project light toward the occupant sitting on the seat:
an imaging device configured to capture an image of the occupant sitting on the seat; and
a processor configured to:
control the light projector and the imaging device to capture the image of the occupant sitting on the seat;
predict a collision of the vehicle;
control, based on the predicted collision of the vehicle, the imaging device to capture the image at a higher speed than a speed at which the image is captured in a normal case where the collision of the vehicle is not predicted;
control imaging operation of the imaging device to switch between a wide-range imaging mode in which an image of an upper body of the occupant sitting on the seat is captured and a narrow-range imaging mode in which an image of a head of the occupant sitting on the seat is captured;
switch the imaging operation of the imaging device to the wide-range imaging mode in the normal case where the collision of the vehicle is not predicted; and
switch the imaging operation of the imaging device to the narrow-range imaging mode based on the predicted collision of the vehicle; and
an occupant protection device configured to execute occupant protection control based on the image of the occupant captured by the imaging device.

15. The occupant protection system for the vehicle according to claim 14,
wherein the occupant protection device is further configured to:
change the occupant protection control in accordance with one of a position or behavior of the head of the occupant sitting on the seat, wherein one of the position or the behavior of the head is based on the image of the occupant captured by the imaging device; and
execute the changed occupant protection control based on a detection of the collision.

16. The occupant protection system for the vehicle according to claim 14, wherein, the occupant protection device is further configured to change, in accordance with one of a position or behavior of the head of the occupant sitting on the seat, at least one of a start timing for deploying an airbag, a position of deployment of the airbag, a direction of deployment of the airbag, a size of deployment of the airbag, a speed of deployment of the airbag, or firmness of the airbag when deployed, and wherein one of the position or the behavior of the head is based on the image of the occupant captured by the imaging device.

17. An occupant monitoring device for a vehicle configured to monitor an occupant sitting on a seat provided in the vehicle, the occupant monitoring device comprising:

an imaging device configured to capture an image of the occupant sitting on the seat; and a processor coupled to a communication network, wherein the processor is configured to:

control the imaging device to capture the image of the occupant sitting on the seat;

determine whether information corresponding to collision prediction of the vehicle is acquired via the communication network; and control, based on the acquisition of the information, the imaging device to capture the image at a higher frame rate than a frame rate at which the image is captured in a normal case where the information is not acquired.

18. The occupant monitoring device for the vehicle according to claim 17, wherein the processor is further configured to:

stop, based on the acquisition of the information, a first process executed in the normal case; and execute, based on the acquisition of the information, a second process on the image captured by the imaging device, wherein the second process includes processing a head region of the occupant sitting on the seat in the image captured by the imaging device.

19. The occupant monitoring device for the vehicle according to claim 17, wherein the processor is further configured to:

control imaging operation of the imaging device to switch between a wide-range imaging mode in which an image of an upper body of the occupant sitting on the seat is captured and a narrow-range imaging mode in which an image of a head of the occupant sitting on the seat is captured;

switch the imaging operation of the imaging device to the wide-range imaging mode in the normal case where the information is not acquired; and switch the imaging operation of the imaging device to the narrow-range imaging mode based on the acquisition of the information.

20. The occupant monitoring device for the vehicle according to claim 17, further comprising a light projector configured to switch a light projection mode between an intermittent lighting mode and a continuous lighting mode, wherein in the intermittent lighting mode, the light projector is configured to project light intermittently, wherein in the continuous lighting mode, the light projector is configured to project the light continuously, and wherein the processor is further configured to:

switch the light projection mode of the light projector from the continuous lighting mode to the intermittent lighting mode in the normal case where the information is not acquired; and switch, based on the acquisition of the information, the light projection mode of the light projector from the intermittent lighting mode to the continuous lighting mode.

* * * * *